United States Patent Office 2,993,028
Patented July 18, 1961

2,993,028
ISOTACTIC POLYPROPYLENE-POLYISOBUTENE BLEND AND METHOD FOR MAKING SAME
Franco Ranalli, Milan, Italy, assignor to Montecatini Societa Generale per l'Industria Mineraria e Chimica, a corporation of Italy
No Drawing. Filed May 26, 1958, Ser. No. 737,518
Claims priority, application Italy June 18, 1957
3 Claims. (Cl. 260—45.5)

This invention relates to thermoplastic materials. More particularly, the invention relates to blends of polypropylene made up for at least 60% of isotactic macromolecules and polyisobutene, which blends are characterized by a brittle point that is considerably lower than the brittle point normally possessed by the polypropylene.

Recently, G. Natta and his co-workers have disclosed new polymers of alpha-olefins of the formula $CH_2=CHR$ where R is a hydrocarbon radical. The polymers referred to are linear, regular head-to-tail, have substantially no branches longer than R, and comprise macromolecules having a regular steric structure which Natta has called the "isotactic structure." The isotactic structure is the structure of the portions of the macromolecules in which, if the macromolecule is arbitrarily assumed to be fully extended in a plane, the R substituents on the tertiary carbon atoms are all on one side (e.g. above) and the H atoms on those carbon atoms are all on the other side (e.g. below) of the plane of the chain. (In a successive isotactic portion of the same chain the position of the R and H substituents may be reversed with respect to the position they had in the previous portion.) The isotactic macromolecules according to Natta et al. are macromolecules which have substantially isotactic structure, are non-extractable with boiling n-heptane, are highly crystallizable, and are crystalline under appropriate conditions.

It is known that polypropylene made up prevailingly (for over 60%) to substantially of isotactic macromolecules as defined has outstanding physical properties, such as, for example, high ultimate tensile strength, high elastic modulus, resistance to high temperatures, and water-resistance. However, the brittle point of such polypropylene is comparatively high, i.e., between 0° C. and 20° C., depending on the average molecular weight of the polymer. The comparatively high brittle point complicates working of the polymer and also detracts from its usefulness under conditions which require good resistance to low temperatures.

A primary object of this invention is to modify the polypropylene made up for at least 60% of the isotactic macromolecules in such a way that the brittle point is decreased, without any substantial damage to the other excellent physical characteristics of the polymer.

This and other objects are accomplished by blending high molecular weight polypropylene made up prevailingly (over 60%) to substantially of isotactic macromolecules with a relatively small amount of a solid polymer of isobutene.

It is found, in accordance with the invention, that it is possible to obtain a product having a brittle point of about −32° C. by blending with the polypropylene a small amount (5 to 20% by weight) of the solid polyisobutene. Moreover, reduction in the brittle point as compared to the brittle point of the polypropylene is obtained without any marked change in the mechanical and thermal characteristics of the polypropylene.

This result is very surprising when it is compared with the result obtained by mixing the polypropylene made up for at least 60% of isotactic macromolecules with polyethylene.

Polyethylene has the very low brittle point of −72° C., whereas polyisobutene has the much higher brittle point of −50° C. to −60° C. Nevertheless, in order to obtain a product having a brittle point of −15° C. to −20° C. by mixing polyethylene with the polypropylene, it is necessary to use the polyethylene in an amount of 70% by weight. The use of that very large amount of polyethylene results in a product having mechanical and thermal properties which are different from those of the polypropylene.

Homogeneous blends of the polypropylene and solid isobutene polymers can be obtained by mixing the polymers at temperatures above the melting point of the polypropylene, and preferably at a temperature of about 180° C., using variable amounts of the solid isobutene polymer but generally amounts of 5% to 20% by weight. The resulting homogeneous blends have a good impact strength down to a temperature of about −32° C., with only slight change in the other characteristics of the polypropylene when the smaller amounts of the solid polyisobutene are used.

The following example is given to illustrate the invention, it being understood that this example is not limiting.

EXAMPLE 950 g. of a solid prevailingly isotactic polypropylene having a molecular weight of 120,000 to 150,000 and which is 86% crystalline are mixed with 50 g. of solid polyisobutene having a molecular weight of 80,000 to 120,000, and, as heat stabilizer, 1.0 g. of "Santowhite" crystals [an antioxidant for rubber which consists essentially of 4,4'-thiobis (3-methyl-6-tert. butylphenol), see Kirk-Othmer "Encyclopedia of Chemical Technology" Rubber Compounding].

The mass is calendered at 180–190° C. for 20 minutes in a roll mixer. The sheet thus obtained is placed in a plate press and pressed at 200° C. for 5 minutes. Samples are cut from the pressed sheet, and tested to determine the brittle point and other constants.

The procedure is repeated twice, except that the starting mixtures consist of 100 g. of the polyisobutene and 900 g. of polypropylene, respectively, 200 g. polyisobutene and 800 g. polypropylene.

The characteristics determined by the tests performed on the specimens are listed in the table below, and compared with the characteristics for specimens made from the polypropylene only.

Table

|  | Polypropylene | Polypropylene plus 5% polyisobutene mol. weight 100,000 | Polypropylene plus 10% polyisobutene mol. weight 100,000 | Polypropylene plus 20% polyisobutene mol. weight 100,000 |
|---|---|---|---|---|
| Brittle point, °C.[1] | +10 +14 | −5 | −14 −16 | −32 |
| Flexural rigidity modulus, kg./cm.[2] [2] | 10,000–11,000 | 10,000–11,000 | 9,000–10,000 | 7,000–8,000 |
| Rockwell R hardness [3] | 95–98 | 83–87 | 81–85 | 60–64 |
| Vicat softening point, °C./5 kg | 84–90 | 80–86 | 74–80 | 58–64 |
| Resilience, kg./cm., at −10° [4] | 20–30 | (5) | (5) | ---------- |

[1] ASTM D746-52T.
[2] ASTM D747-50.
[3] ASTM D785-51.
[4] ASTM D256-47T without notch.
[5] Does not break.

By "prevailing to substantially isotactic polypropylene" as used herein, is meant a polypropylene in which at least 60% of the macromolecules have substantially the isotactic structure as described herein. As Natta et al. have shown, the isotactic macromolecules are produced in a mixture with a greater or less proportion of linear, regular head-to-tail atactic macromolecules when the monomer is polymerized with the aid of catalysts prepared from compounds of transition metals of groups IV to VI of the periodic table and organometallic compounds of groups II to III of the table (Mendeleef) and depending on which compounds, particularly which transition metal halides, are used in preparing the catalyst. The polypropylene at least 60% of the macromolecules of which are isotactic macromolecules used in practicing this invention may comprise up to 40% of the Natta et al linear, regular head-to-tail atactic macromolecules.

The polypropylene made up prevailingly to substantially of the isotactic macromolecules may have a molecular weight of 100,000 to 150,000 or higher.

Solid isobutene polymers are known in the art. Those used for lowering the brittle point of the polypropylene in accordance with this invention can have molecular weights between, e.g. 80,000 and 120,000 or higher.

Shaped articles and molded massive objects of different kinds can be made from the blends of the invention by usual molding and shaping techniques.

Various changes in details may be made in practicing this invention without departing from the spirit thereof. Therefore it is intended to include in the scope of the appended claims all such modifications as may be apparent to those skilled in the art.

What is claimed is:
1. A thermoplastic composition consisting essentially of a homogeneous blend of a solid polypropylene made up for at least 60% of isotactic macromolecules, and from about 5% to about 20% by weight of solid polyisobutene, said composition being characterized in that the temperature at which it becomes brittle is lower than the temperature at which the polypropylene normally exhibits brittleness, and in having good impact strength at temperatures down to −32° C.

2. A method for manufacturing shaped objects comprising polypropylene made up for at least 60% of isotactic macromolecules but having excellent impact strength at low temperatures, which method comprises blending the polypropylene with about 5% to about 20% by weight of polyisobutene, and forming the blend thus obtained into a manufactured object of predetermined shape.

3. Manufactured shaped objects of a thermoplastic material consisting essentially of a mixture of solid polyproylene made up for at least 60% of isotactic macromolecules and from about 5% to about 20% by weight of a solid isobutene polymer, said objects having substantially the mechanical characteristics of like objects formed from the polypropylene but a brittle point which is lower than the brittle point of the polypropylene, and having good impact strength at temperatures down to −32° C.

References Cited in the file of this patent
UNITED STATES PATENTS 2,615,857    Clarke    Oct. 28, 1952
2,791,576    Field    May 7, 1957